United States Patent [19]
Mizusawa

[11] Patent Number: 5,798,870
[45] Date of Patent: Aug. 25, 1998

[54] MICROSCOPE OBJECTIVE LENS AND MICROSCOPE

[75] Inventor: Masayuki Mizusawa, Yokohama, Japan

[73] Assignee: Nikon Corporation, Tokyo, Japan

[21] Appl. No.: 684,810

[22] Filed: Jul. 22, 1996

[30] Foreign Application Priority Data

Jul. 21, 1995 [JP] Japan .................................. 7-207603

[51] Int. Cl.$^6$ .......................... G02B 21/02; G02B 21/00
[52] U.S. Cl. ......................... 359/659; 359/368; 359/656
[58] Field of Search ........................... 359/350, 355–357, 359/362, 368, 385, 656–661, 754, 763, 770

[56] References Cited

U.S. PATENT DOCUMENTS

| | | | |
|---|---|---|---|
| 3,879,111 | 4/1975 | Goto | 359/659 |
| 4,184,747 | 1/1980 | Uetake | 359/659 |
| 4,208,099 | 6/1980 | Tojyo | 359/659 |
| 4,501,474 | 2/1985 | Kimura | 359/659 |
| 4,756,611 | 7/1988 | Yonekubo et al. | 359/388 |
| 5,132,845 | 7/1992 | Suzuki | 359/656 |

FOREIGN PATENT DOCUMENTS 55-79406  6/1980  Japan .

Primary Examiner—Thong Nguyen
Attorney, Agent, or Firm—Foley & Lardner

[57] ABSTRACT

A microscope objective lens is provided as a semi-apochromatic microscope objective lens whose magnification is about 20, in which the image surface is flat from the center to the periphery with favorably corrected various kinds of aberration, and which can also be used for observing fluorescence under downward radiation. The microscope objective lens comprises, successively from the object side, a negative meniscus lens component L1 having a concave surface directed onto the object side, a positive meniscus lens component L2 having a concave surface directed onto the object side, a cemented positive lens component L3, a cemented positive lens component L4, and a negative meniscus cemented lens component L5 having a concave surface directed onto the image side, wherein the following conditions:

$$-11 < f1/f < 31.3$$

$$-12 < f5/f < -7$$

are satisfied.

13 Claims, 8 Drawing Sheets

MICROSCOPE OBJECTIVE LENS AND MICROSCOPE

BACKGROUND OF THE INVENTION

1. Field of the Invention

The present invention relates to a microscope objective lens and a microscope and, in particular, to a semi-apochromatic microscope objective lens and a microscope that can also be used for observing fluorescence under downward radiation.

2. Related Background Art

In general, microscope objective lenses for observing fluorescence must comply with a condition for improving their transmittance with respect to ultraviolet excitation light (excitation wavelength: about 365 nm). In a short wavelength region such as that of ultraviolet excitation light, however, not only are the kinds of optical materials having favorable transmittance limited, but also the number of constituent lens sheets cannot be increased in order to secure a predetermined transmittance. Accordingly, it has been difficult for the microscope objective lenses used for observing fluorescence to correct aberration.

As a conventional microscope objective lens for observing fluorescence, the objective lens disclosed in Japanese Patent Laid-Open No. 55-79406 has been known.

Typically, when a microscope objective lens having a magnification of 20 or less is used for observing a sample, the whole image of the sample is likely to be observed. Accordingly, it is necessary for the microscope objective lens having a magnification of 20 or less to favorably correct aberration even in the peripheral portion. In the conventional microscope objective lens such as that disclosed in the above-mentioned publication, however, image surface curvature has not been favorably corrected, whereby the flatness of the image is not so favorable in the peripheral portion.

SUMMARY OF THE INVENTION

In view of the foregoing problems, the object of the present invention is to provide a semi-apochromatic microscope objective lens having a magnification of about 20, in which the image surface is flat from the center to the periphery with favorably corrected various kinds of aberration, and which can also be used for observing fluorescence under downward radiation.

In order to overcome the above-mentioned problems, the microscope objective lens of the present invention comprises: successively from the object side, a negative meniscus lens component L1 having a concave surface directed onto the object side; a positive meniscus lens component L2 having a concave surface directed onto the object side; a cemented positive lens component L3; a cemented positive lens component L4; and a negative meniscus cemented lens component L5 having a concave surface directed onto the image side, wherein, assuming that the focal length of the negative meniscus lens component L1 is f1, the focal length of the whole lens system is f, and the focal length of the negative meniscus cemented lens component L5 is f5, the following conditions:

$$-11 < f1/f < -3$$

$$-12 < f5/f < -7$$

are satisfied.

In a preferable embodiment of the present invention, the cemented positive lens component L3 has at least one negative lens; the negative meniscus cemented lens component L5 has at least one positive lens; and assuming that the Abbe number of the at least one negative lens in the cemented positive lens component L3 is ν3n, the axial air space between the cemented positive lens component L4 and the negative meniscus cemented lens component L5 is D, and the focal length of the whole lens system is f, the following conditions:

$$\nu 3n < 45$$

$$1 < D/f < 3$$

are satisfied.

Also, the present invention provides a microscope comprising:

a light source for generating light with which a sample is irradiated;

an objective lens for subjecting the light from the sample to parallel; and an imaging lens for forming, on an image surface, an image of the parallel light from the objective lens;

wherein the objective lens comprises, successively from the object side, a negative meniscus lens component L1 having a concave surface directed onto the object side, a positive cemented lens component L2 having a concave surface directed onto the object side, a cemented positive lens component L3, a cemented positive lens component L4, and a negative meniscus cemented lens component L5 having a concave surface directed onto the image side, and wherein, assuming that the focal length of the negative meniscus lens component L1 is f1, the focal length of the whole lens system is f, and the focal length of the negative meniscus cemented lens component L5 is f5, the following conditions:

$$-11 < f1/f < -3$$

$$-12 < f5/f < -7$$

are satisfied.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

As mentioned above, the microscope objective lens of the present invention comprises, successively from the object side, a negative meniscus lens component L1 having a concave surface directed onto the object side, a positive meniscus lens component L2 having a concave surface directed onto the object side, a cemented positive lens component L3, a cemented positive lens component L4, and a negative meniscus cemented lens component L5 having a concave surface directed onto the image side, while satisfying predetermined conditional expressions.

In the following, each conditional expression of the present invention will be explained.

The present invention satisfies the following conditional expressions (1) and (2):

$$-11 < f1/f < -3 \tag{1}$$

$$-12 < f5/f < -7 \tag{2}$$

wherein f1: focal length of the negative meniscus lens component L1;

f: focal length of the whole lens system; and f5: focal length of the negative meniscus cemented lens component L5.

Conditional expression (1) defines an appropriate range for the refractive power of the negative meniscus lens component L1.

Beyond the upper limit of conditional expression (1), the negative refractive power of the negative meniscus lens component L1 becomes so strong that the positive meniscus lens component L2 has to carry a large amount of refractive power, thereby deteriorating spherical aberration.

Below the lower limit of conditional expression (1), by contrast, the negative refractive power of the negative meniscus lens component L1 becomes so weak that Petzval sum is corrected insufficiently, thereby deteriorating image surface curvature.

Conditional expression (2) defines an appropriate range for the refractive power of the negative meniscus cemented lens component L5.

Beyond the upper limit of conditional expression (2), the negative refractive power of the negative meniscus cemented lens component L5 becomes so strong that Petzval sum is corrected too much, thereby deteriorating image surface curvature.

Below the lower limit of conditional expression (2), by contrast, the negative refractive power of the negative meniscus cemented lens component L5 becomes so weak that Petzval sum is corrected insufficiently, thereby deteriorating image surface curvature.

Desirably, in the present invention, the cemented positive lens component L3 has at least one negative lens; the negative meniscus cemented lens component L5 has at least one positive lens; and the following conditions are satisfied:

$$v3n < 45 \tag{3}$$

$$1 < D/f < 3 \tag{4}$$

wherein v3n: Abbe number of the negative lens in the cemented positive lens component L3, and D: axial air space between the cemented positive lens component L4 and the negative meniscus cemented lens component L5.

Conditional expression (3) defines an appropriate range for Abbe number of the negative lens in the cemented positive lens component L3.

Beyond the upper limit of conditional expression (3), it is not preferable in that both chromatic aberration in magnification and axial chromatic aberration are insufficiently corrected.

Conditional expression (4) defines an appropriate range for the axial air space between the cemented positive lens component L4 and the negative meniscus cemented lens component L5.

Beyond the upper limit of conditional expression (4), chromatic aberration in magnification is corrected too much, whereby the positive lens in the negative meniscus cemented lens component L5 has to carry refractive power too much. As a result, coma in color unfavorably loses its balance.

Below the lower limit of conditional expression (4), by contrast, it is not preferable in that chromatic aberration in magnification is insufficiently corrected.

In the following, embodiments of the present invention will be explained with reference to attached drawings.

In each embodiment, the microscope objective lens of the present invention comprises, successively from the object side, a negative meniscus lens component L1 having a concave surface directed onto the object side, a positive meniscus lens component L2 having a concave surface directed onto the object side, a cemented positive lens component L3, a cemented positive lens component L4, and a negative meniscus cemented lens component L5 having a concave surface directed onto the image side.

Figure 7:
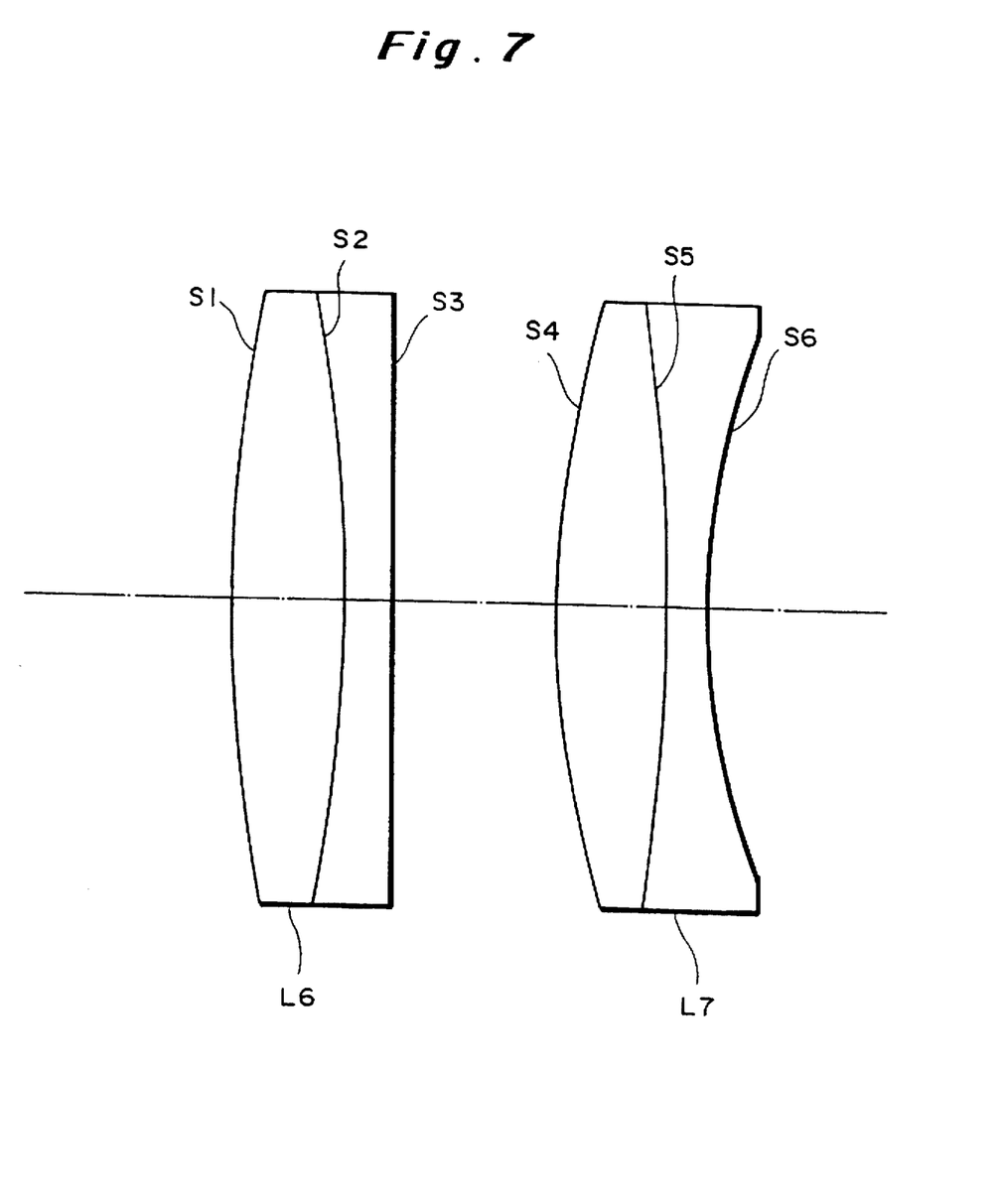
FIG. 7 is a view showing a configuration of an imaging lens in each embodiment.

Here, in each embodiment, as shown in FIG. 7, an imaging lens (second objective lens) is disposed on the image side of the microscope objective lens with an axial air space of 145 mm therebetween. As the microscope objective lens and the imaging lens are used in combination, an infinite distance type optical system is formed. Here, the imaging lens comprises, successively from the object side, a cemented positive lens L6 composed of a biconvex lens and a biconcave lens, and a cemented positive lens L7 composed of a biconvex lens and a biconcave lens.

The following Table 1 shows values of various items of the imaging lens in each embodiment. In Table 1, S1 to S6 at the left end indicate lens surfaces in the order counted from the object side, r indicates the radius of curvature of each lens surface, d indicates each lens surface spacing, and n and v respectively indicate the refractive index and Abbe number with respect to d-line ($\lambda$=587.6 nm).

TABLE 1

| | r | d | n | v |
|---|---|---|---|---|
| S1 | 75.0450 | 5.1 | 1.6228 | 57.0 |
| S2 | −75.045 | 2.0 | 1.7500 | 35.2 |
| S3 | 1,600.5800 | 7.5 | | |
| S4 | 50.2560 | 5.1 | 1.6676 | 42.0 |
| S5 | −84.5410 | 1.8 | 1.6127 | 44.4 |
| S6 | 36.9110 | | | |

Embodiment 1

Figure 1:
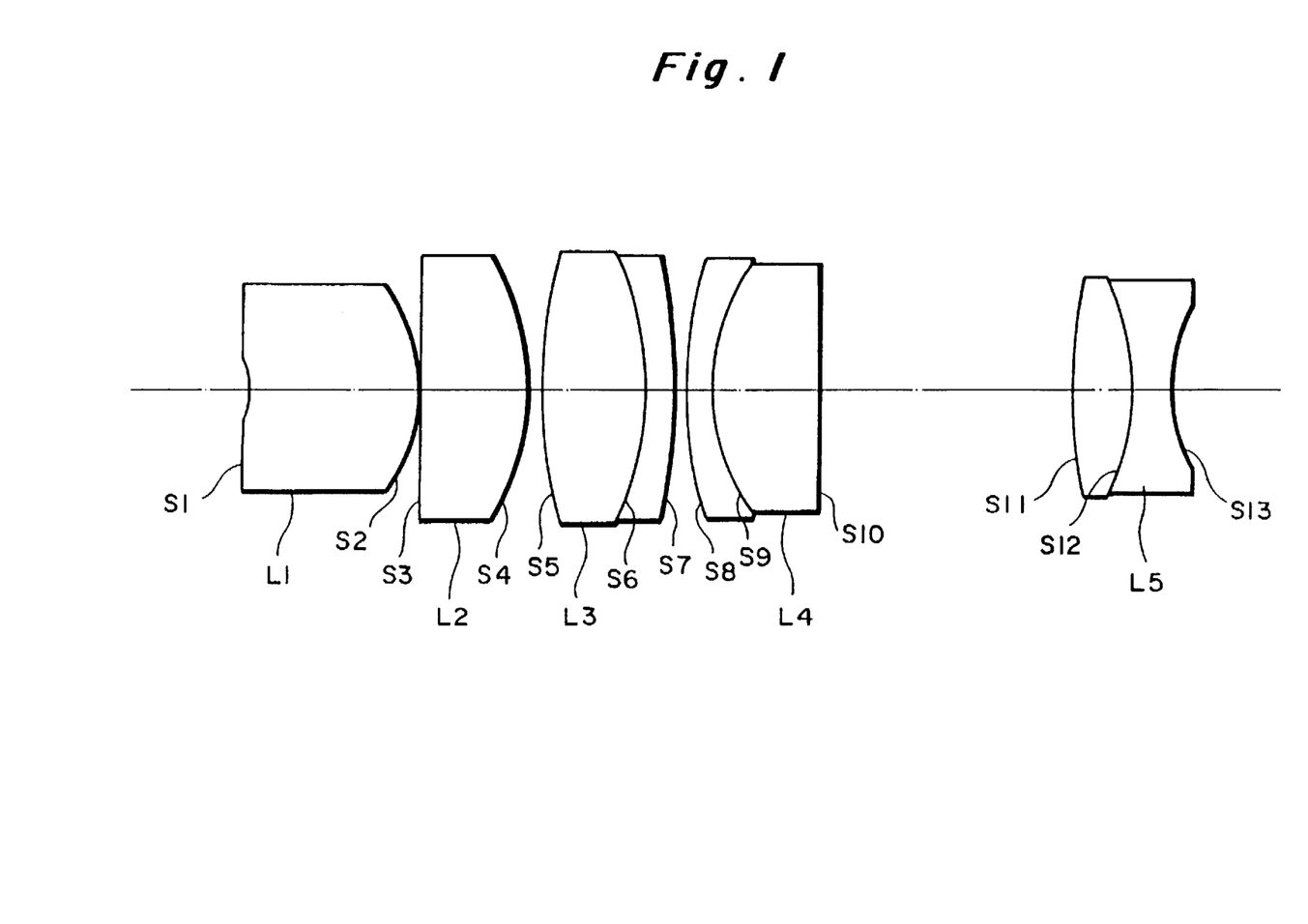
FIG. 1 is a view showing a configuration of a microscope objective lens in accordance with Embodiment 1 of the present invention.
Figure 2A:
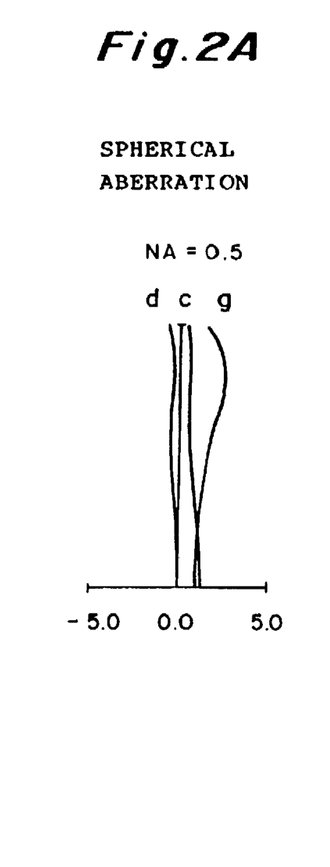
FIGS. 2A to 2D are aberration charts of the microscope objective lens in Embodiment 1.
Figure 2B:
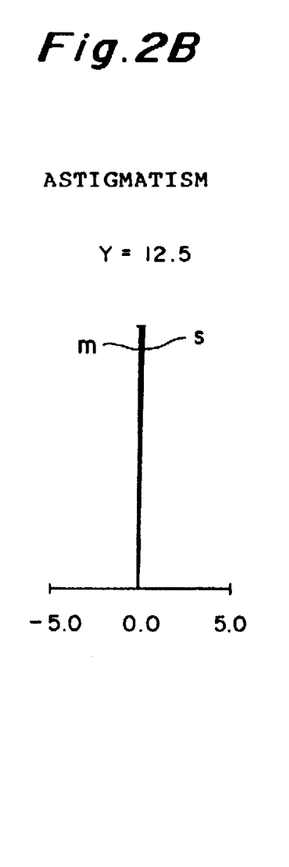
Figure 2C:
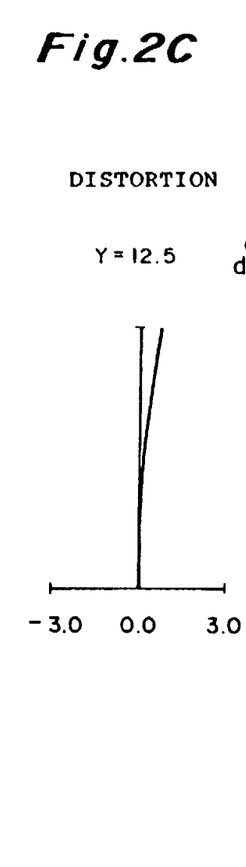
Figure 2D:
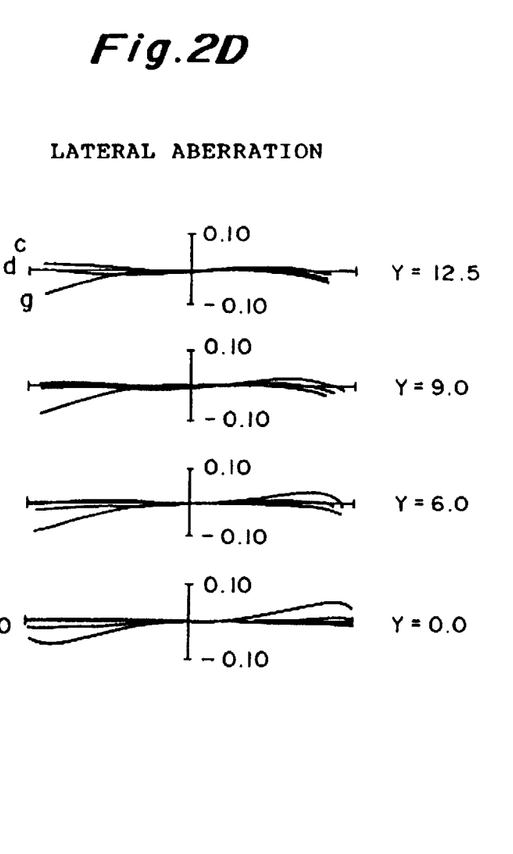

FIG. 1 shows a configuration of a microscope objective lens in accordance with Embodiment 1 of the present invention.

The depicted microscope objective lens comprises, successively from the object side, a negative meniscus lens component L1 having a concave surface directed onto the object side, a positive meniscus lens component L2 having a concave surface directed onto the object side, a cemented positive lens component L3 composed of a biconvex lens and a negative meniscus lens having a concave surface directed onto the object side, a cemented positive lens component L4 composed of a negative meniscus lens having a convex surface directed onto the object side and a biconvex lens, and a cemented negative lens component L5 composed of a biconvex lens and a biconcave lens.

The following Table 2 shows values of various items in Embodiment 1 of the present invention. In Table 2, f, NA, β, and WD respectively indicate the focal length, numerical aperture, magnification, and working distance of the whole lens system.

Further, S1 to S13 at the left end indicate lens surfaces in the order counted from the object side, r indicates the radius of curvature of each lens surface, d indicates each lens surface spacing, and n and v respectively indicate the refractive index and Abbe number with respect to d-line (λ=587.6 nm).

TABLE 2

β = 20×
NA = 0.5
WD = 1.8 mm
f = 10.0 mm

| | r | d | n | v |
|---|---|---|---|---|
| S1 | −4.8011 | 9.8 | 1.5638 | 60.7 |
| S2 | −9.3534 | 0.25 | | |
| S3 | −299.9470 | 6.05 | 1.4978 | 82.5 |
| S4 | −13.8449 | 0.85 | | |
| S5 | 30.9460 | 5.7 | 1.4339 | 95.6 |
| S6 | −16.7003 | 1.5 | 1.6034 | 38.0 |
| S7 | −41.9840 | 0.9 | | |
| S8 | 28.8900 | 1.3 | 1.6889 | 31.1 |
| S9 | 11.5001 | 5.95 | 1.4339 | 95.6 |
| S10 | −213.9230 | 14.35 | | |
| S11 | 27.8930 | 3.45 | 1.6034 | 38.0 |
| S12 | −12.5000 | 2.1 | 1.5014 | 56.4 |
| S13 | 11.5001 | | | |

(Values Corresponding to Conditions)

(1) f1/f = −7.82
(2) f5/f = −9.66
(3) v3n = 38.0
(4) D/f = 1.435

FIGS. 2A to 2D show charts for various kinds of aberration of the microscope objective lens in Embodiment 1.

In each aberration chart, Y, NA, D, c, and g indicate image height, numerical aperture, d-line (λ=587.6 nm), C-line (λ=656.3 nm), and g-line (λ=435.6 nm), respectively.

In the aberration chart showing astigmatism, continuous curve s indicates the sagittal image surface, whereas broken curve m indicates the meridional image surface.

As can be seen from each aberration chart, in this embodiment, various kinds of aberration have been favorably corrected while a simple lens configuration with optical materials having a high transmittance with respect to ultraviolet excitation light for observing fluorescence under downward radiation is used. In particular, the flatness of the image is found to have been favorably secured in an area extending from the center to the periphery.

Embodiment 2

Figure 3:
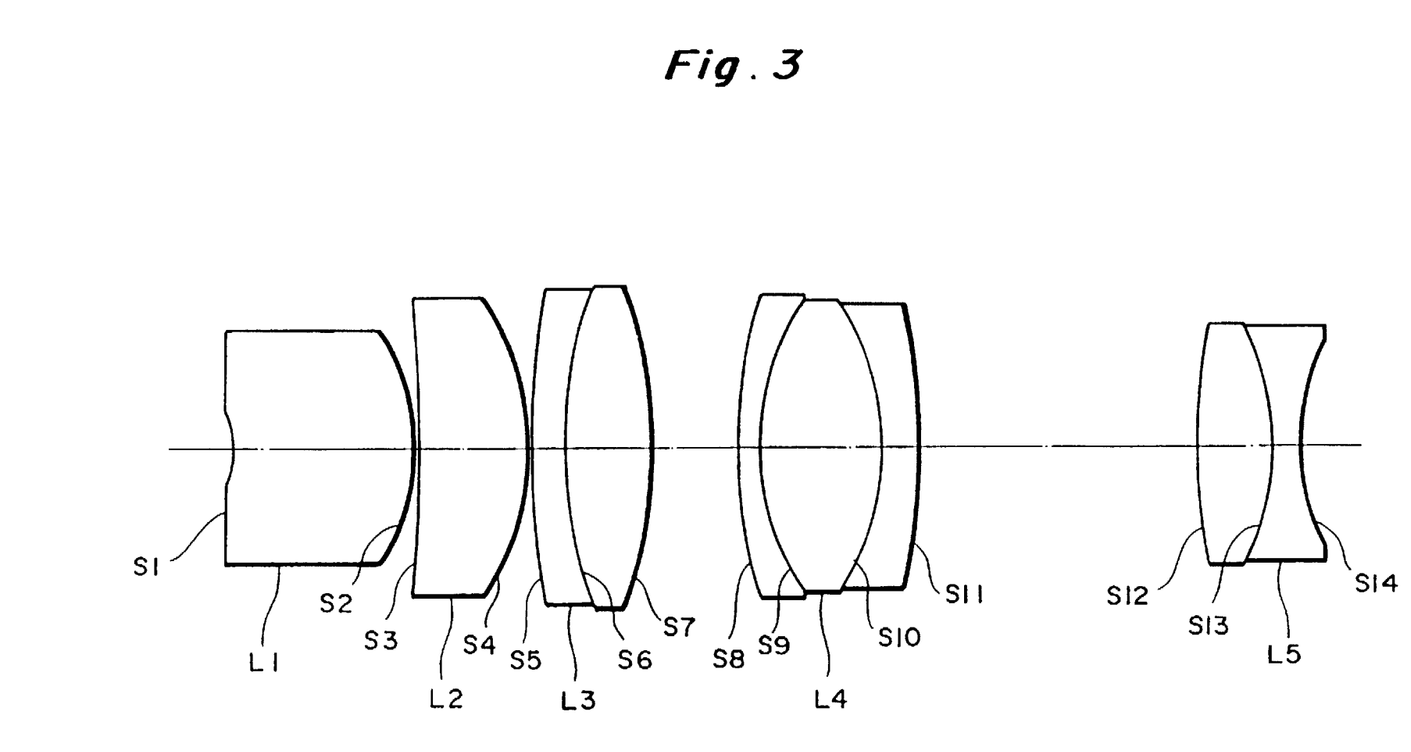
FIG. 3 is a view showing a configuration of a microscope objective lens in accordance with Embodiment 2 of the present invention.
Figure 4A:
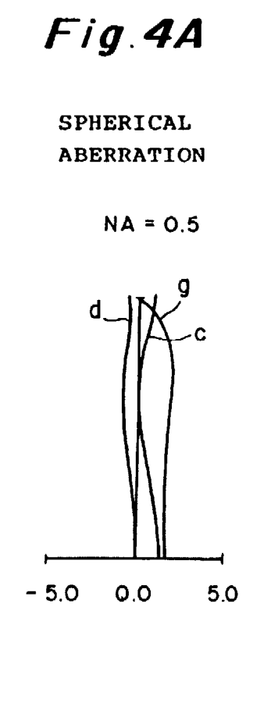
FIGS. 4A to 4D are aberration charts of the microscope objective lens in Embodiment 2.
Figure 4B:
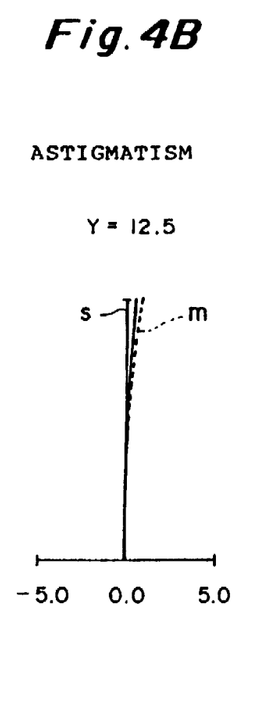
Figure 4C:
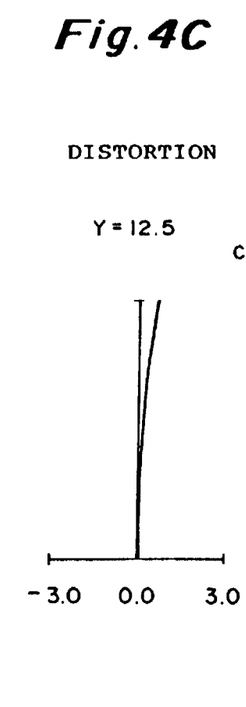
Figure 4D:
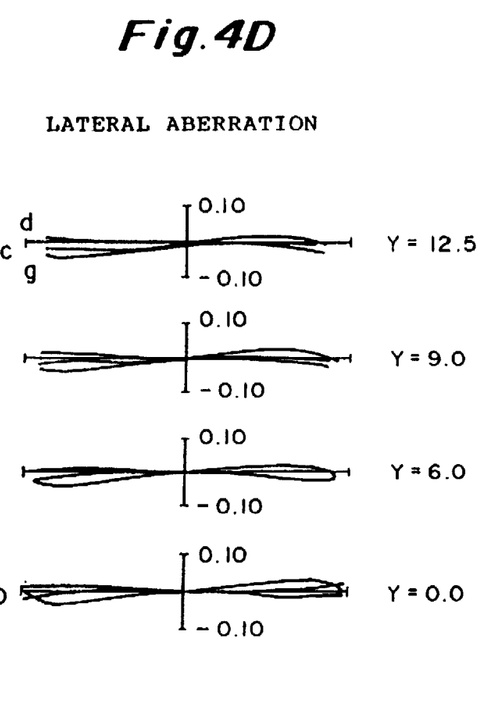

FIG. 3 shows a configuration of a microscope objective lens in accordance with Embodiment 2 of the present invention.

The depicted microscope objective lens comprises, successively from the object side, a negative meniscus lens component L1 having a concave surface directed onto the object side; a positive meniscus lens component L2 having a concave surface directed onto the object side; a cemented positive lens component L3 composed of a negative meniscus lens having a convex surface directed onto the object side and a biconvex lens; a cemented positive lens component L4 composed of a negative meniscus lens having a convex surface directed onto the object side, a biconvex lens, and a negative meniscus lens having a concave surface directed onto the object side; and a cemented negative lens component L5 composed of a biconvex lens and a biconcave lens.

The following Table 3 shows values of various items in Embodiment 2 of the present invention. In Table 2, f, NA, β, and WD respectively indicate the focal length, numerical aperture, magnification, and working distance of the whole lens system.

Further, S1 to S14 at the left end indicate lens surfaces in the order counted from the object side, r indicates the radius of curvature of each lens surface, d indicates each lens surface spacing, and n and v respectively indicate the refractive index and Abbe number with respect to d-line (λ=587.6 nm).

TABLE 3

β = 20×
NA = 0.5
WD = 1.85 mm
f = 10.0 mm

| | r | d | n | v |
|---|---|---|---|---|
| S1 | −4.7194 | 9.2 | 1.5638 | 60.7 |
| S2 | −10.7507 | 0.2 | | |
| S3 | −108.5070 | 5.45 | 1.5186 | 70.0 |
| S4 | −14.1701 | 0.2 | | |
| S5 | 45.6890 | 1.7 | 1.5750 | 41.4 |
| S6 | 22.2500 | 4.3 | 1.4339 | 95.6 |
| S7 | −22.2500 | 4.4 | | |
| S8 | 26.0490 | 1.1 | 1.6727 | 32.2 |
| S9 | 13.2001 | 6.0 | 1.4339 | 95.6 |
| S10 | −13.2001 | 1.7 | 1.6034 | 38.0 |
| S11 | −44.5600 | 14.1 | | |
| S12 | 36.7780 | 3.7 | 1.6034 | 53.7 |
| S13 | −13.66911 | 1.3 | 1.4875 | 70.4 |
| S14 | 12.0508 | | | |

(Values Corresponding to Conditions)

(1) f1/f = −3.31
(2) f5/f = −7.42
(3) v3n = 41.4
(4) D/f = 1.41

FIGS. 4A to 4D show charts for various kinds of aberration of the microscope objective lens in Embodiment 2.

In each aberration chart, Y, NA, D, c, and g indicate image height, numerical aperture, d-line (λ=587.6 nm), C-line (λ=656.3 nm), and g-line (λ=435.6 nm), respectively.

In the aberration chart showing astigmatism, continuous curve s indicates the sagittal image surface, whereas broken curve m indicates the meridional image surface.

As can be seen from each aberration chart, in this embodiment, various kinds of aberration have been favorably corrected while a simple lens configuration with optical materials having a high transmittance with respect to ultraviolet excitation light for observing fluorescence under downward radiation is used. In particular, the flatness of the image is found to have been favorably secured in an area extending from the center to the periphery.

Embodiment 3

Figure 5:
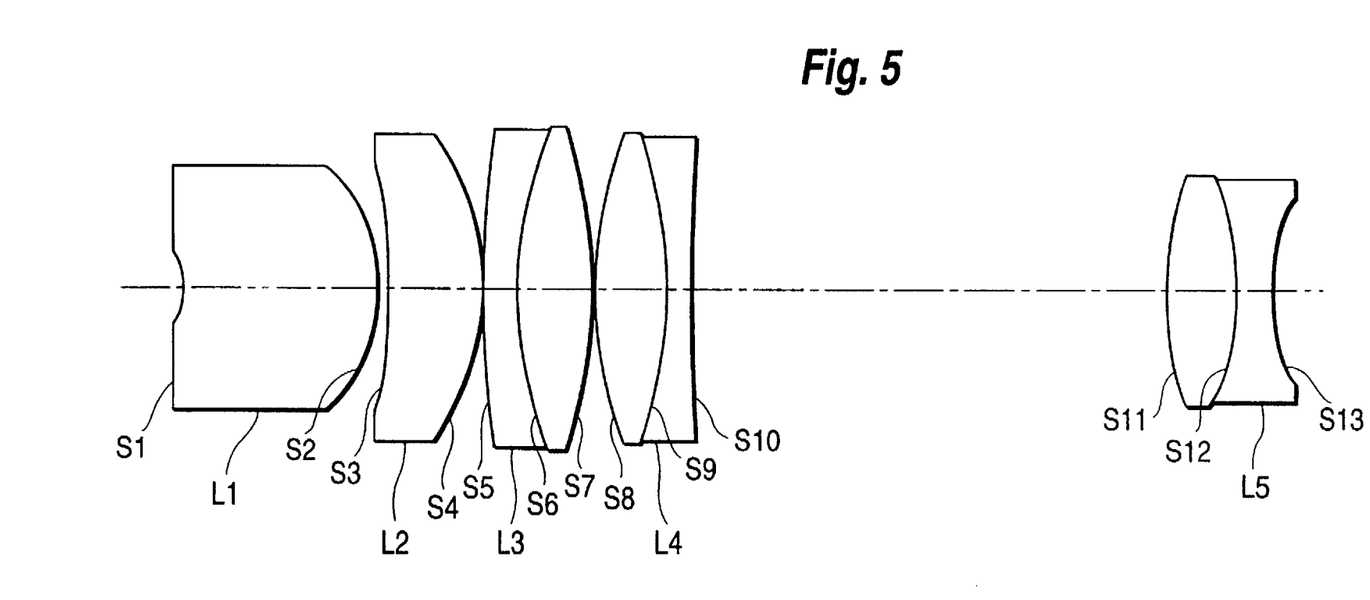
FIG. 5 is a view showing a configuration of a microscope objective lens in accordance with Embodiment 3 of the present invention.
Figure 6A:
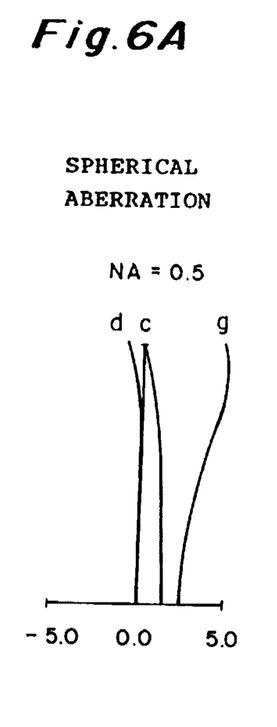
FIGS. 6A to 6D are aberration charts of the microscope objective lens in Embodiment 3.
Figure 6B:
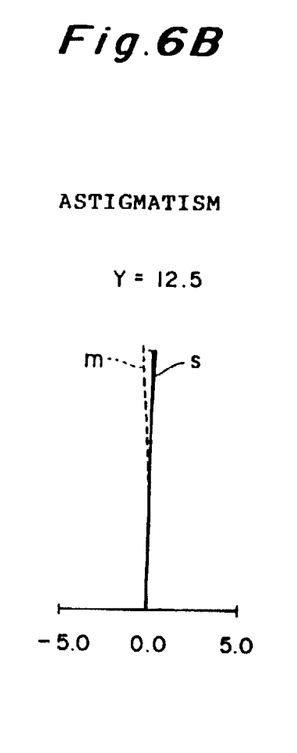
Figure 6C:
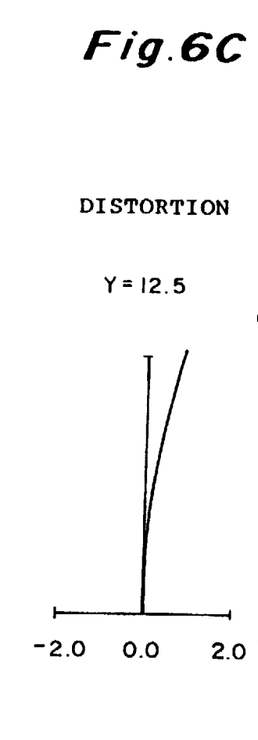
Figure 6D:
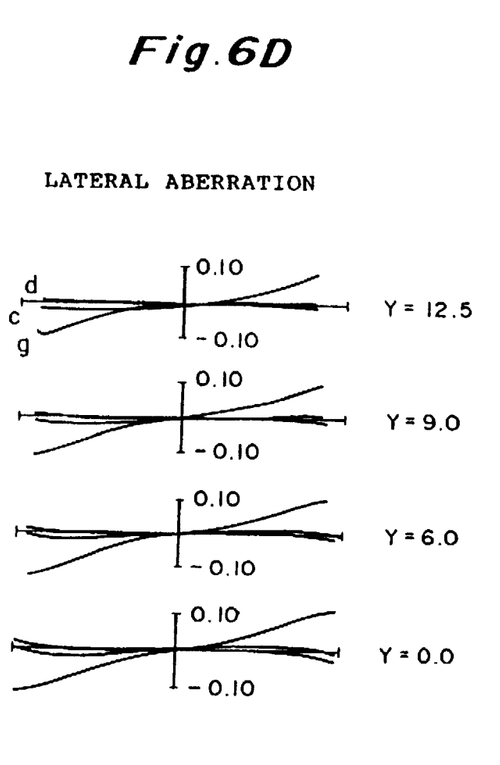

FIG. 5 shows a configuration of a microscope objective lens in accordance with Embodiment 3 of the present invention.

The depicted microscope objective lens comprises, successively from the object side, a negative meniscus lens component L1 having a concave surface directed onto the object side, a positive meniscus lens component L2 having a concave surface directed onto the object side, a cemented positive lens component L3 composed of a negative meniscus lens having a convex surface directed onto the object side and a biconvex lens, a cemented positive lens component L4 composed of a biconvex lens and a biconcave lens, and a cemented negative lens component L5 composed of a biconvex lens and a biconcave lens.

The following Table 4 shows values of various items in Embodiment 3 of the present invention. In Table 4, f, NA, β, and WD respectively indicate the focal length, numerical aperture, magnification, and working distance of the whole lens system.

Further, S1 to S13 at the left end indicate lens surfaces in the order counted from the object side, r indicates the radius of curvature of each lens surface, d indicates each lens surface spacing, and n and v respectively indicate the refractive index and Abbe number with respect to d-line (λ=587.6 nm).

TABLE 4

β = 20×
NA = 0.5
WD = 2.1 mm
f = 10.0 mm

|     | r        | d     | n      | v    |
|-----|----------|-------|--------|------|
| S1  | −4.9107  | 10.0  | 1.5638 | 60.7 |
| S2  | −9.2500  | 0.4   |        |      |
| S3  | −63.3900 | 4.95  | 1.4978 | 82.5 |
| S4  | −13.8170 | 0.2   |        |      |
| S5  | 99.1410  | 1.5   | 1.6034 | 38.0 |
| S6  | 23.5021  | 3.8   | 1.4339 | 95.6 |
| S7  | −23.5021 | 0.2   |        |      |
| S8  | 23.5021  | 3.8   | 1.4339 | 95.6 |
| S9  | −23.5021 | 1.2   | 1.6727 | 32.2 |
| S10 | 166.5200 | 24.55 |        |      |
| S11 | 22.4254  | 3.5   | 1.6034 | 38.0 |
| S12 | −17.0491 | 1.55  | 1.5268 | 51.4 |
| S13 | 11.9087  |       |        |      |

(Values Corresponding to Conditions)

(1) f1/f = −10.98
(2) f5/f = −10.98
(3) v3n = 38.0
(4) D/f = 2.455

FIGS. 6A to 6D show charts for various kinds of aberration of the microscope objective lens in Embodiment 3.

In each aberration chart, Y, NA, D, c, and g indicate image height, numerical aperture, d-line (λ=587.6 nm), C-line (λ=656.3 nm), and g-line (λ=435.6 nm), respectively.

In the aberration chart showing astigmatism, continuous curve s indicates the sagittal image surface, whereas broken curve m indicates the meridional image surface.

As can be seen from each aberration chart, in this embodiment, various kinds of aberration have been favorably corrected while a simple lens configuration with optical materials having a high transmittance with respect to ultraviolet excitation light for observing fluorescence under downward radiation is used. In particular, the flatness of the image is found to have been favorably secured in an area extending from the center to the periphery.

As explained in the foregoing, the present invention can realize a semi-apochromatic microscope objective lens whose magnification is about 20, in which the image surface is flat from the center to the periphery with favorably corrected various kinds of aberration, and which can also be used for observing fluorescence under downward radiation.

Embodiment 4

Figure 8:
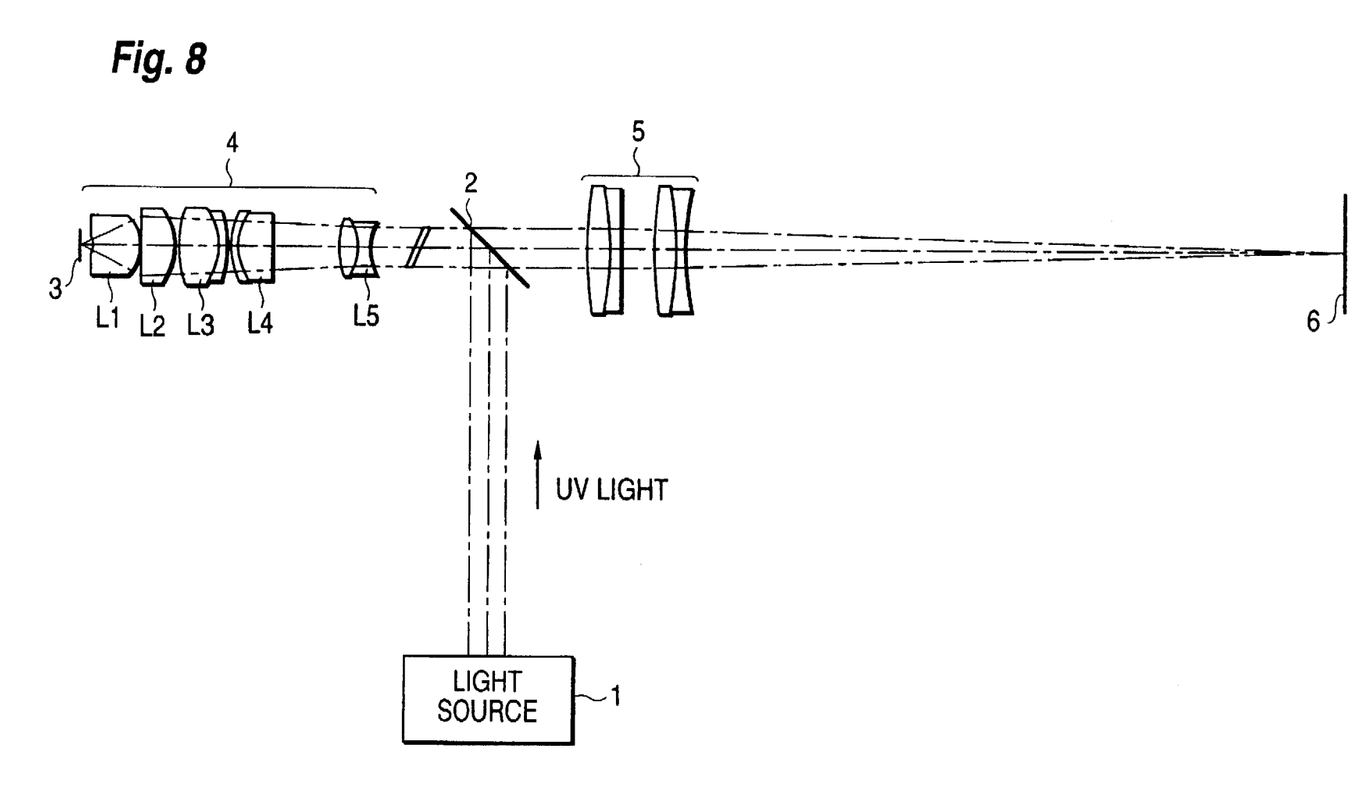
FIG. 8 is a schematic configurational view of a microscope in accordance with Embodiment 4 of the present invention.

FIG. 8 is a schematic configurational view showing a microscope in accordance with Embodiment 4 of the present invention. In this drawing, the microscope, e.g., microscope for observing fluorescence, has a light source 1, e.g., extra-high pressure mercury lamp, which generates light with a short wavelength, i.e., ultraviolet excitation light. Also, the microscope provides the above mentioned objective lens 4 for subjecting the light from a sample 3 to parallel and an imaging lens 5 for forming, on an image surface 6, an image of the parallel light from the objective lens 4.

The ultraviolet excitation light emitted from the light source 1 irradiates the sample 3 by way of a dichroic mirror 2, for example. This dichroic mirror has a characteristic for reflecting the excitation light with a short wavelength while transmitting therethrough fluorescence with a long wavelength. Upon irradiation with the ultraviolet excitation light, the sample 3 emits light which has a wavelength longer than that of the excitation light. Thus emitted light, which is fluorescence, forms an image on the image surface 6 by way of the microscope objective lens 4 and the imaging lens (second objective lens) 5.

Since the microscope objective lens in accordance with the foregoing embodiments is used, a microscope having favorably corrected various kinds of aberration while securing a sufficient transmittance can be obtained.

Here, the present invention relates to an infinity correction type microscope, and U.S. Pat. Nos. 4,501,474 and 5,132,845 are incorporated herein by reference. The present invention is suitably applicable not only to microscopes for observing fluorescence but also to other microscopes using general kinds of light, thereby yielding effects similar to those mentioned above.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.207603/1995 filed on Jul. 21, 1995 is hereby incorporated by reference.

What is claimed is:

1. A microscope objective lens comprising:
    successively from an object side, a negative meniscus lens component having a concave surface directed onto the object side; a positive meniscus lens component having a concave surface directed onto the object side; a first cemented positive lens component; a second cemented positive lens component; and a negative meniscus cemented lens component having a concave surface directed onto an image side, wherein, assuming that focal length of said negative meniscus lens component is f1, focal length of the whole lens system is f, and focal length of the negative meniscus cemented lens component is f5, the following conditions:

$$-11 < f1/f < -3,$$

and $$-12 < f5/f < -7,$$

are satisfied.

2. A microscope objective lens according to claim 1, wherein said first cemented lens component has at least one negative lens; said negative meniscus cemented lens component has at least one positive lens; and assuming that Abbe number of said at least one negative lens in said first cemented positive lens component is ν3n, and axial air space between said second cemented positive lens component and said negative meniscus cemented lens component is D, the following conditions:

$$\nu 3n < 45,$$

and
$$1 < D/f < 3,$$

are satisfied.

3. A microscope objective lens according to claim 1, wherein a magnification amount of the microscope objective lens is approximately 20.

4. A microscope comprising:

a light source for generating light with which a sample is irradiated;

an objective lens for transforming the light from said sample to parallel light; and an imaging lens for forming, on an image surface, an image of the parallel light from said objective lens;

wherein said objective lens comprises, successively from an object side, a negative meniscus lens component having a concave surface directed onto the object side; a positive meniscus lens component having a concave surface directed onto the object side; a first cemented positive lens component; a second cemented positive lens component; and a negative meniscus cemented lens component having a concave surface directed onto an image side, and wherein, assuming that focal length of said negative meniscus lens component is f1, focal length of the whole lens system is f, and focal length of said negative meniscus cemented lens component is f5, the following conditions:

$$-11 < f1/f < -3$$

and $$-12 < f5/f < -7,$$

are satisfied.

5. A microscope objective lens according to claim 4, wherein said first cemented lens component has at least one negative lens; said negative meniscus cemented lens component has at least one positive lens; and assuming that Abbe number of said at least one negative lens in said first cemented positive lens component is ν3n, and axial air space between said second cemented positive lens component and said negative meniscus cemented lens component is D, the following conditions:

$$\nu 3n < 45,$$

and $$1 < D/f < 3,$$

are satisfied.

6. A microscope according to claim 4, wherein said microscope is an infinity correction type microscope.

7. A microscope according to claim 4, wherein a magnification amount of the microscope is approximately 20.

8. A microscope according to claim 4, wherein the light source outputs ultraviolet light.

9. A microscope according to claim 8, wherein the imaging lens comprises:

a third cemented positive lens component having a biconvex lens and a biconcave lens; and a fourth cemented positive lens component having a biconvex lens and a biconcave lens, wherein the third cemented positive lens is disposed closer to the object than the fourth cemented positive lens component.

10. A microscope objective lens for observing an object, said microscope objective lens comprising:

a negative meniscus lens component having a concave surface facing the object;

a positive meniscus lens component disposed next to the negative meniscus lens component at a position further from the object than the negative meniscus lens component, the positive meniscus lens component having a concave surface facing the object;

a first cemented positive lens component disposed next to the positive meniscus lens component at a position further from the object than the positive meniscus lens component, the first cemented positive lens component having a biconvex lens portion and a negative meniscus lens portion having a concave surface facing the object, wherein the negative meniscus lens portion of the first cemented positive lens component is disposed further from the object than the biconvex lens portion of the first cemented positive lens component;

a second cemented positive lens component disposed next to the first cemented positive lens component at a position further from the object than the first cemented positive lens component, the second cemented positive lens component having a negative meniscus lens portion and a biconvex lens portion, wherein the biconvex lens portion of the second cemented positive lens component is disposed further from the object than the negative meniscus portion of the second cemented positive lens component; and a negative meniscus cemented lens component disposed apart from the second cemented positive lens component at a predetermined distance, the negative meniscus cemented lens component having a biconvex lens portion and a biconcave lens portion, the negative meniscus cemented lens component being located at a position further from the object than the second cemented positive lens component.

11. A microscope objective lens according to claim 10, wherein the following conditions are satisfied:

$$-11 < f1/f < -3,$$

and $$-12 < f5/f < -7,$$

where a focal length of the microscope objective lens is f, a focal length of the negative meniscus lens component is f1, and a focal length of the negative meniscus cemented lens component is f5.

12. A microscope objective lens for observing an object, said microscope objective lens comprising:

- a negative meniscus lens component having a concave surface facing the object;
- a positive meniscus lens component disposed next to the negative meniscus lens component at a position further from the object than the negative meniscus lens component, the positive meniscus lens component having a concave surface facing the object;
- a first cemented positive lens component disposed next to the positive meniscus lens component at a position further from the object than the positive meniscus lens component, the first cemented positive lens component having a biconvex lens portion and a negative meniscus lens portion having a convex surface facing the object, wherein the negative meniscus lens portion of the first cemented positive lens component is disposed closer to the object than the biconvex lens portion of the first cemented positive lens component;
- a second cemented positive lens component disposed next to the first cemented positive lens component at a position further from the object than the first cemented positive lens component, the second cemented positive lens component having a biconvex lens portion and a biconcave lens portion, wherein the biconvex lens portion of the second cemented positive lens component is disposed closer to the object than the biconcave lens portion of the second cemented positive lens component; and
- a negative meniscus cemented lens component disposed apart from the second cemented positive lens component at a predetermined distance, the negative meniscus cemented lens component having a biconvex lens portion and a biconcave lens portion, the negative meniscus cemented lens component being located at a position further from the object than the second cemented positive lens component.

13. A microscope objective lens according to claim 12, wherein the following conditions are satisfied:

$$-11 < f1/f < -3,$$

and $$-12 < f5/f < -7,$$

where a focal length of the microscope objective lens is f, a focal length of the negative meniscus lens component is f1, and a focal length of the negative meniscus lens component is f5.

* * * * *